UNITED STATES PATENT OFFICE.

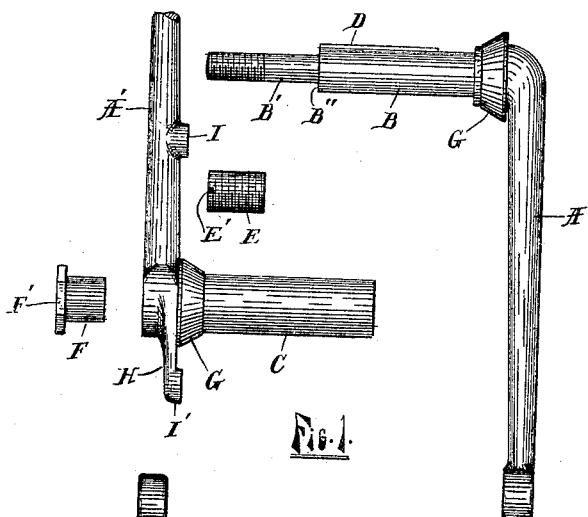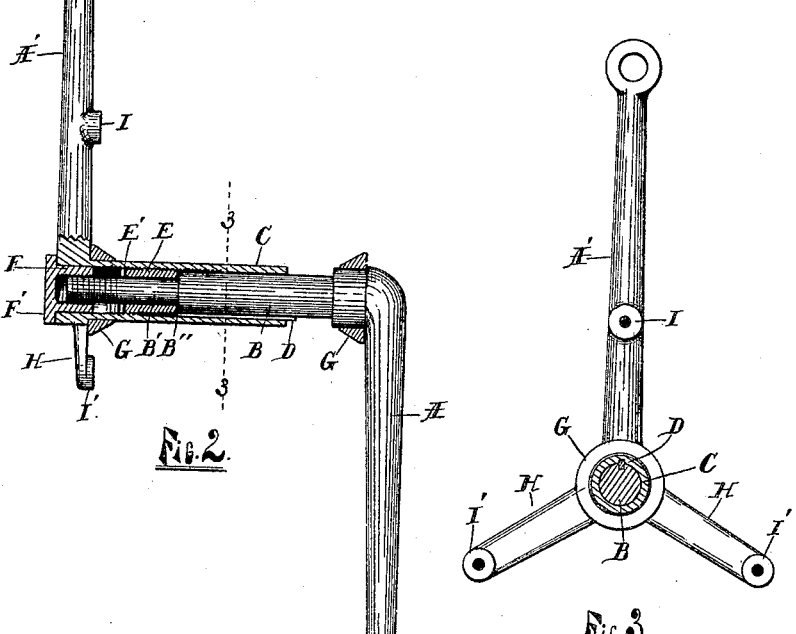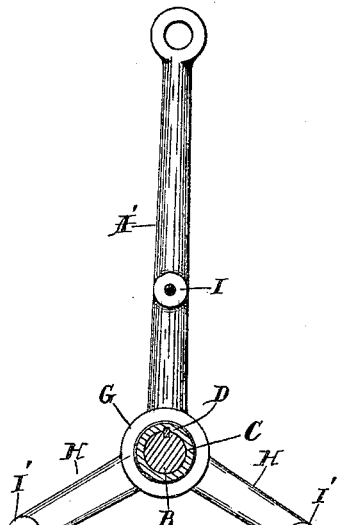

WARREN W. ANNABLE, OF GRAND RAPIDS, MICHIGAN.

BICYCLE CRANK-SHAFT.

SPECIFICATION forming part of Letters Patent No. 622,644, dated April 4, 1899.

Application filed February 12, 1898. Serial No. 670,011. (No model.)

*To all whom it may concern:*

Be it known that I, WARREN W. ANNABLE, a citizen of the United States, residing at Grand Rapids, in the county of Kent and State of Michigan, have invented certain new and useful Improvements in Bicycle Crank-Shafts; and I do hereby declare the following to be a full, clear, and exact description of the invention, such as will enable others skilled in the art to which it appertains to make and use the same.

My invention relates to improvements in bicycle crank-shafts; and its object is to provide a divided shaft integral with the cranks and adjustable for length and on which fixed cones may be used and to provide the same with certain other new and useful features hereinafter more fully described, and particularly pointed out in the claims, reference being had to the accompanying drawings, in which—

Figure 1 is an elevation of the detached parts of a device embodying my invention; Fig. 2, the same assembled and with portions in section to show the construction, and Fig. 3 a transverse section of the same on the line 3 3 of Fig. 2.

Like letters refer to like parts in all of the figures.

A represents one of the cranks, which crank is bent at right angles, forming an integral shaft B, having a reduced and screw-threaded end B' and a shoulder B''. The other crank A' is provided with an integral sleeve C, extending at right angles from its inner end and having an axial opening to receive the shaft B and internally screw-threaded a portion of its length to engage screw-threads on the outside of an adjustable tubular stop E, said stop having an axial opening to receive the reduced part B' of the shaft and abutting at one end against the shoulder B'' and provided at the other end with a transverse nick E' for engagement of any suitable tool to rotate and adjust said stop.

D is a key seated in suitable grooves in the shaft B and sleeve C to prevent said shaft from turning in the sleeve and to hold the cranks in line with each other. F is an internally-threaded tubular nut having a head F', said head being adapted to a wrench and engaging the outer end of the sleeve C.

G G are suitable cone-bearings on the shaft B and sleeve C. These bearings may be made integral with the shaft and sleeve, but are preferably separate and made a tight fit thereon and held in place by friction. The crank A' is provided with a screw-threaded boss I and diverging arms H H, having screw-threaded bosses I' I', thus providing a suitable spider to which the sprocket-wheel may be attached. The shaft B and sleeve C thus form a divided shaft integral with the cranks and adjustable for length, whereby the fixed cones may be adjusted to the bearing-balls, and the cranks may be readily detached from each other.

Having thus fully described my invention, what I claim, and wish to secure by Letters Patent, is—

1. A bicycle crank-shaft consisting of a shaft having a shoulder and a reduced and threaded end, a sleeve having an internally-threaded axial opening to receive said shaft, an externally-threaded tubular stop in said sleeve having nicks in its end and engaging said shoulder, and a nut on the end of said shaft engaging the end of said sleeve and fixed cones on said sleeve and shaft, substantially as described.

2. The combination of a crank having an integral shaft, said shaft having a shoulder and a reduced and threaded end, a sleeve having an internally-threaded axial opening, a threaded tubular stop in said sleeve engaging said shoulder, a crank on said sleeve, a nut on the end of the shaft engaging the end of the sleeve, a key engaging grooves in the shaft and sleeve, and fixed cones on said shaft and sleeve adjacent to said cranks, substantially as described.

In testimony whereof I affix my signature in presence of two witnesses.

WARREN W. ANNABLE.

Witnesses:
LUTHER V. MOULTON,
LEWIS E. FLANDERS.